May 17, 1938.  H. SALVATORI  2,117,364

APPARATUS FOR SEISMIC SURVEYING

Filed Dec. 24, 1936  2 Sheets-Sheet 1

INVENTOR
Henry Salvatori
BY George L. Parkhurst
ATTORNEY

May 17, 1938. H. SALVATORI 2,117,364
APPARATUS FOR SEISMIC SURVEYING
Filed Dec. 24, 1936 2 Sheets-Sheet 2

INVENTOR
Henry Salvatori
BY George L. Parkhurst
ATTORNEY

Patented May 17, 1938

2,117,364

UNITED STATES PATENT OFFICE 2,117,364

APPARATUS FOR SEISMIC SURVEYING

Henry Salvatori, Hollywood, Calif., assignor to Western Geophysical Company, Los Angeles, Calif., a corporation of Delaware Application December 24, 1936, Serial No. 119,898

12 Claims. (Cl. 181—0.5)

This invention relates to the art of seismic surveying and more particularly to apparatus used in the art of seismic surveying by the reflection method.

Various procedures are known for the determination of the slope of sub-surface geological formations by the use of reflected seismic waves. One of the commonest and most useful of these is the so-called "dip shooting" technique. My invention has to do primarily with a new arrangement of apparatus which brings about an improvement in that technique.

This improvement will be described in more detail by reference to the drawings which are diagrammatic plan views of various set-ups for use in seismic surveying by the reflection method and more particularly in dip shooting. In the drawings.

Figure 1:
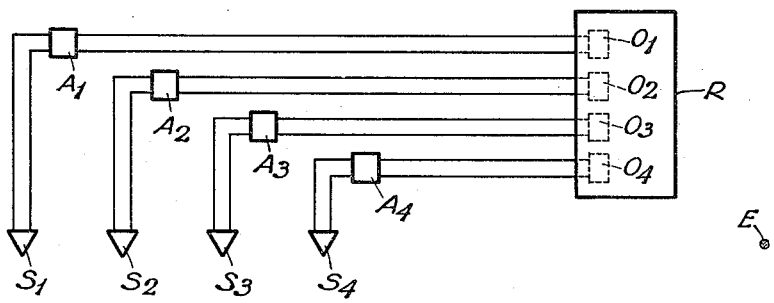
Figure 1 illustrates a common prior art set-up.

Referring more particularly to the drawings, Figure 1 illustrates a common arrangement for use in seismic surveying by the reflection method. A number of seismometers $S_1$, $S_2$, etc. are arranged in line with each other and in line with the shot hole containing an explosive charge E. The detonation of this explosive charge generates seismic waves, some components of which are reflected by sub-surface geological formations. The reflected waves along with other waves are received at the various seismometers and converted into electrical waves thereby. The electrical waves produced by the seismometers are amplified by amplifiers $A_1$, $A_2$, etc. and the amplified waves actuate oscillograph elements $O_1$, $O_2$, etc. in recorder R. The recorder is equipped to photograph all of the oscillograph elements on a moving sensitized strip. Means not shown can be and preferably are provided for recording the instant of the detonation of explosive charge E on the photographic record.

Theoretically a single seismometer could be used instead of a large number of seismometers but in most instances it would be utterly impossible to determine which of the waves received at the seismometer represented reflections. When using a number of seismometers at progressive distances from the point of origin of the seismic waves, the inflections on the various record "traces" due to reflected waves from a single reflecting formation will line up, while the inflections due to other waves will show great deviations in times of arrival at the various seismometers. Thus a comparison of the record traces produced by photographing the various oscillograph elements permits ready identification of the reflected waves. Moreover, it permits a determination of the dip of the sub-surface geological formation causing the particular reflection by measuring the "move out time" or, in other words, the small difference in time required for a wave reflected from the same formation to reach the various seismometers. All this is familiar to those skilled in the art.

Figure 2:
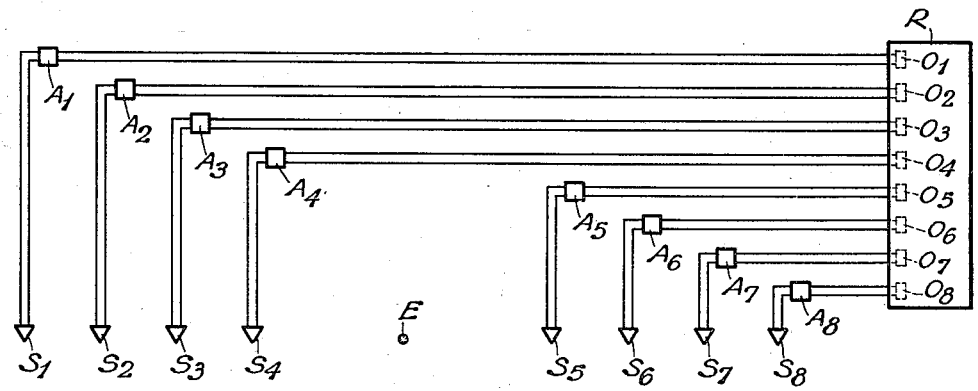
Figure 2 illustrates a modified prior art set-up known as a "split spread"

It is also known to the art to use a so-called "split spread" as illustrated in Figure 2. This is an entirely similar arrangement to that of Figure 1 except that one set of seismometers is arranged up-dip from the shot hole or explosive charge E and another set is arranged down-dip from the shot hole or explosive charge E. Thus in Figure 2 seismometers $S_1$ to $S_4$ extend in one direction from explosive charge E while seismometers $S_5$ to $S_8$ extend in the other direction. As in the case of the set-up of Figure 1, the electrical waves produced by the seismometers are amplified by amplifiers $A_1$ to $A_8$, motivate oscillograph elements $O_1$ to $O_8$ and are recorded on a moving photographic strip in recorder R. This split spread arrangement has several important advantages over the set-up of Figure 1. One of the most important of these is that by making a single record for points both up-dip and down-dip and averaging the results over the whole spread, certain velocity errors cancel out.

However, in order to accomplish this it is necessary to recognize reflections from the same sub-surface formation both in the case of seismometers $S_1$–$S_4$ and in the case of seismometers $S_5$–$S_8$. This is often extremely difficult and sometimes completely impossible since there is necessarily a very considerable gap between the two seismometers nearest the shot hole or, in other words, between seismometers $S_4$ and $S_5$ of Figure 2. Since the distance between these two seismometers is much greater than the distance between other adjacent seismometers the record becomes discontinuous so far as the terrain near the shot hole is concerned and, as previously pointed out, the identification of points of inflection on the record traces representing reflections from a particular formation becomes difficult or impossible.

On the other hand, this difficulty cannot be overcome by merely placing the seismometers of Figure 2 closer to the shot hole since I have found that there is a minimum distance between seismometer and shot hole for satisfactory operation. If a seismometer is placed closer to the shot hole than this minimum distance the surface waves and other relatively direct waves as well as the disturbances due to the tamping liquid blowing out of the shot hole are of such violence as to disturb the delicate equipment in a very serious manner. These violent disturbances prevent the satisfactory recording of the reflected waves.

Thus under most circumstances it will be found necessary to have seismometers $S_4$ and $S_5$ at least about 150 feet apart whereas the interval between seismometers within the groups $S_1$–$S_4$ and $S_5$–$S_8$ may have to be 50 feet or even less in order to do satisfactory geophysical prospecting in certain regions.

It is an object of my invention to overcome the difficulties inherent in the use of a split spread while retaining all of its advantages. Another object is to provide apparatus for producing a superior record both up-dip and down-dip from a shot point. It is also an object to provide apparatus for use in reflection seismic surveying operations to give a continuous, uninterrupted record. A further object is to provide reflection seismic surveying apparatus which will simplify the analysis of the record and render that analysis more accurate. Other and more detailed objects will become apparent as the description of my invention proceeds.

Figure 3:
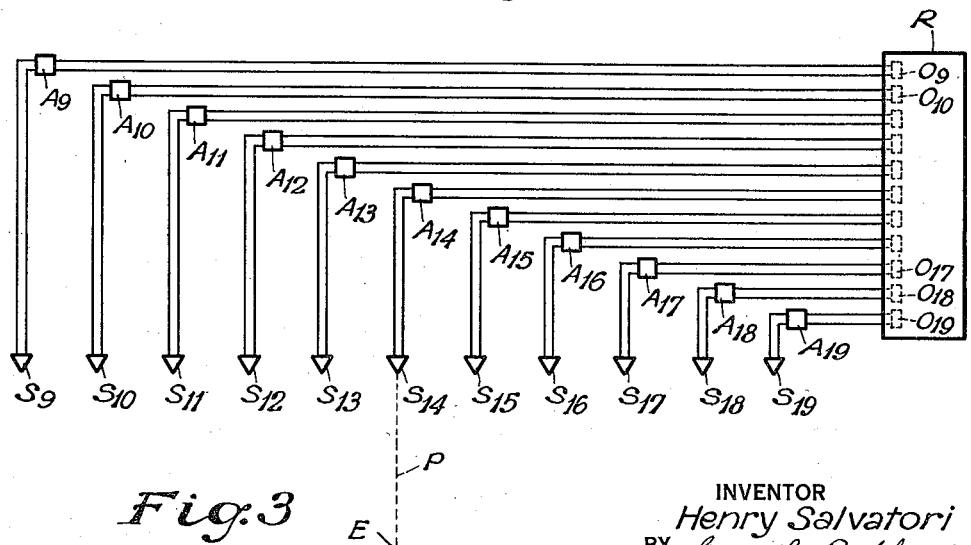
Figure 3 illustrates a so-called "offset spread" set-up in accordance with my invention.
Figure 4:
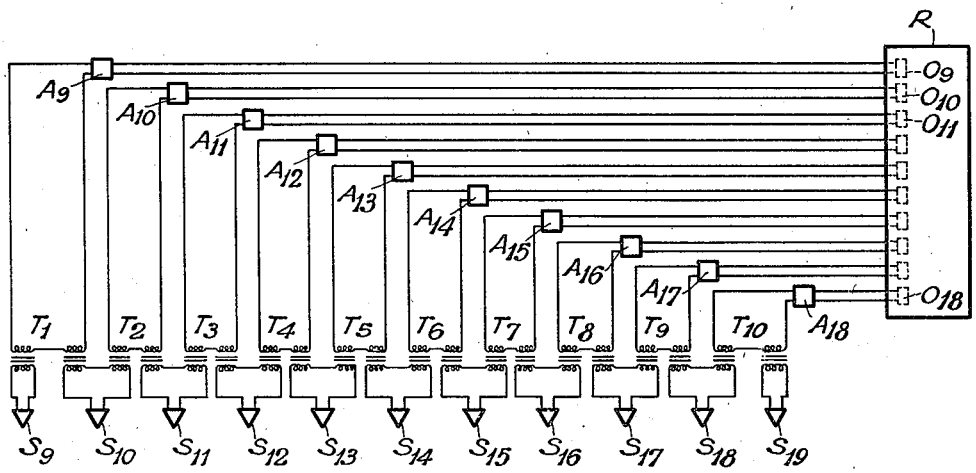
Figure 4 illustrates a set-up similar to that of Figure 3 but utilizing an improved hook-up of seismometers and recording elements.
Figure 5:
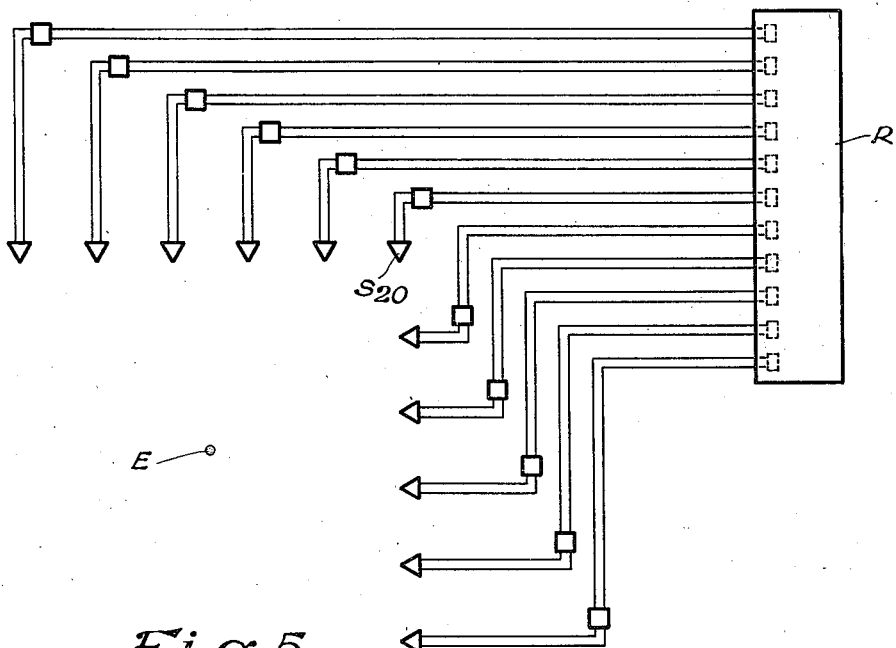
Figure 5 illustrates an offset spread set-up in which the seismometers are arranged on two intersecting lines.

I have overcome the difficulties inherent in the use of a split spread by the use of the offset spread arrangement of Figures 3, 4, and 5. In accordance with this invention the seismometers are placed in line with each other but not in line with the shot hole or explosive charge E. The distance between the line of seismometers and the shot hole is determined so that the distance from the shot hole to the nearest seismometers is at least the minimum for successful and safe recording, i. e. at least about 75 feet. At the same time it is important that this distance be relatively small since the use of an excessive distance means that the distances from the shot point to the various seismometers are nearly equal and this is undesirable since the refracted waves as well as the reflected waves then arrive approximately simultaneously and it is difficult or impossible to identify reflections. I prefer that the shot point be from about 100 feet to about 300 feet from the nearest seismometer and in any event not over 1000 feet from it.

As shown in Figure 3, a group of eleven seismometers $S_9$–$S_{19}$ is used. Greater or lesser numbers of seismometers can be used. I prefer to use at least six. Seismometers $S_9$–$S_{12}$ of Figure 3 correspond so far as spacing is concerned to seismometers $S_1$–$S_4$ while seismometers $S_{16}$–$S_{19}$ correspond to seismometers $S_5$–$S_8$ of Figure 2. The offsetting of the seismometers from the shot hole makes feasible the use of three additional intermediate seismometers $S_{13}$–$S_{15}$ and thus makes possible a continuous record. In some cases even more than three additional intermediate seismometers are made possible. The electrical waves produced by the various seismometers are amplified by the amplifying elements of corresponding subscript number and actuate the oscillograph elements of corresponding subscript number.

It is highly desirable that the arrangement be such that a perpendicular line P from the shot hole to the line of seismometers bisects the line of seismometers. In other words the end seismometers should be substantially equidistant from the shot point since this makes possible the elimination of velocity corrections and permits an accurate, direct determination of dip. This line P, or the horizontal distance from the shot hole to the nearest seismometer may suitably be from about 75 to about 1000 feet in length or preferably from about 100 feet to about 300 feet in length. Under most circumstances I find it desirable to operate with the shot hole about 200 feet from the line of seismometers since this distance is sufficient to give good recording on the center seismometers and permits the ready identification of reflected waves. The spacing between adjacent seismometers will depend on local conditions but may suitably be from about 25 feet to about 75 feet. Even smaller spacings can be used. It will be noted that the horizontal offset of the explosive charge from the line of seismometers is substantially greater than the spacing between seismometers, in fact it is usually at least twice as great.

The seismometers need not be on a straight line so long as the end seismometers are equidistant from the shot point, a continuous uninterrupted chain of seismometers is located between the end seismometer, and the minimum and maximum distances between the shot hole and the nearest seismometer are preserved in accordance with principles previously discussed. However, the straight line arrangement is by far the best since it is the most economical and permits the most ready and accurate identification of reflected waves.

Figure 4 shows a set-up identical with that of Figure 3 except that seismometers are hooked up to the amplifying and recording elements in an overlapped fashion. This overlapping is particularly adapted to use with the offset spread arrangement of my invention. In Figure 4 it will be noted that seismometer $S_9$ actuates oscillograph element $O_9$ through transformer $T_1$ and amplifier $A_9$. Seismometer $S_{10}$ also actuates oscillograph element $O_9$ through transformer $T_1$ and amplifier $A_9$. In addition it actuates oscillograph element $O_{10}$ through transformer $T_2$ and amplifier $A_{10}$. Seismometer $S_{11}$ actuates oscillograph element $O_{10}$ through transformer $T_2$ and amplifier $A_{10}$ and also actuates oscillograph element $O_{11}$ through transformer $T_3$ and amplifier $A_{11}$. Similarly, each of the remaining seismometers actuates two adjacent oscillograph elements except seismometer $S_{19}$ which actuates only oscillograph element $O_{18}$.

This overlapping permits a gradual transition from trace to trace since each trace represents effects of seismic waves received at two adjacent seismometers. The result is that the identification of reflected waves from the record is much facilitated and measurement of the reflected wave is made more accurate. Furthermore, a greater degree of amplification is made possible since adjacent oscillograph strings are not likely to get out of phase with each other as in the case of the arrangement of Figure 2.

While I have shown two seismometers actuating each oscillograph element or, in other words, a 50% overlap in Figure 4, it will readily be understood that other degrees of overlap can be used. Thus seismometers $S_9$, $S_{10}$ and $S_{11}$ could be made to actuate the first oscillograph element; $S_{10}$, $S_{11}$ and $S_{12}$ the second; $S_{11}$, $S_{12}$ and $S_{13}$ the third; etc.

The combined use of the offset spread and the overlapping leads to an excellence of result not heretofore accomplished.

My offset spread idea can also be applied to shooting along two intersecting lines. Thus, as shown in Figure 5, seismometers can be arranged in two offset lines at right angles to each other, the two lines preferably meeting in a common corner seismometer $S_{20}$. This arrangement is of advantage in cases where there is a sudden change in slope of the sub-surface formation being measured. Determinations along two lines permit the identification of the two slopes.

With the exception of seismometer $S_{20}$ the various seismometers, amplifiers and oscillograph elements of Figure 5 have not been numbered since to do so would serve no useful purpose.

It is advantageous to use a common corner seismometer $S_{20}$ and a single record for both lines of seismometers since this permits the identification of the same reflection for both lines of seismometers. The shot hole should be located on the intersection of the perpendicular bisectors of the two lines of seismometers. The seismometers and the shot hole should be in offset relationship in accordance with principles hereinbefore set forth.

The overlap idea can be applied with advantage to the two-line offset spread set-up described in the last three paragraphs.

While I have described my invention in connection with certain preferred embodiments thereof, it is to be understood that these are by way of illustration rather than by way of limitation and the scope of my invention is defined only by the appended claims which should be construed as broadly as the prior art will permit.

I claim:

1. Apparatus for reflection seismic surveying comprising means for generating seismic waves, a large number of seismometers arranged in line with each other, said line being horizontally offset from the position of said generating means by a distance of from about 75 feet to about 1000 feet, and extending in each of two directions from a point opposite said generating means, the end seismometers being substantially equidistant from said generating means, and means responsive to the reflected seismic waves received by the various seismometers for forming a record comprising a plurality of traces.

2. Apparatus for seismic surveying by the reflection method comprising means for generating seismic waves, a large number of spaced seismometers arranged in a substantially straight line, said straight line being horizontally offset from the position of said generating means by a distance not more than about 1000 feet and extending a substantially equal distance in each of two directions from a perpendicular line drawn from said generating means to said line of seismometers and means for recording, as a series of comparative indicia, the responses of said seismometers to said seismic waves.

3. Apparatus for reflection seismic surveying comprising means for generating seismic waves, a large number of spaced seismometers arranged in a substantially straight line, said straight line being horizontally offset from the position of said generating means by a distance at least twice the distance between adjacent seismometers but not more than 1000 feet, and means for forming a single comparative record corresponding to the reflected seismic waves received by the various seismometers.

4. Apparatus according to claim 3 in which said adjacent seismometers are spaced from about 25 feet to about 75 feet apart.

5. Apparatus according to claim 3 in which a perpendicular line drawn from the position of said generating means to said line of seismometers is from about 100 feet to about 300 feet in length.

6. Apparatus for reflection seismic surveying comprising means for generating seismic waves, at least six substantially uniformly spaced seismometers arranged in a line horizontally offset from said generating means by a distance of from about 75 feet to about 1000 feet, and means responsive to the reflected seismic waves received by the various seismometers for forming a plurality of record traces on a single record, said record traces indicating progressively and comparatively the characteristics of reflected seimic waves received along said line of seismometers.

7. Apparatus for reflection seismic surveying comprising means for generating seismic waves, two end seismometers located substantially equidistant from said generating means, a large number of approximately equally spaced seismometers forming a continuous, uninterrupted chain between said end seismometers, said generating means being horizontally offset from a line drawn through the various seismometers, the distance from said generating means to the nearest seismometer being at least about twice the spacing between adjacent seismometers but not more than about 1000 feet, and means responsive to the reflected seismic waves received by the various seismometers for forming a plurality of record traces on a single record, said record traces indicating progressively and comparatively the characteristics of reflected seismic waves received along said line of seismometers.

8. Equipment set-up for reflection seismic surveying comprising an explosive charge disposed in a shot hole for generating seismic waves, at least six seismometers, substantially uniformly spaced, arranged in a substantially straight line horizontally offset from said shot hole by a distance at least twice the distance between spaced seismometers but not more than about 1000 feet, said line of seismometers, extending in each of two directions from a point opposite said shot hole, and means responsive to the reflected seismic waves received by the various seismometers for forming a plurality of record traces on a single record, said record traces indicating progessively and comparatively the characteristics of reflected seismic waves received along said line of seismometers.

9. Apparatus for reflection seismic surveying comprising means for generating seismic waves, a large number of spaced seismometers arranged in a line horizontally offset from the position of said generating means by a distance not more than about 1000 feet and extending in both directions from a line perpendicular to said line of seismometers drawn from the position of said generating means, a plurality of recorder elements and means for actuating said recorder elements by said seismometers in overlapped relationship substantially as described.

10. Apparatus for reflection seismic surveying comprising means for generating seismic waves, a plurality of seismometers arranged in line with each other, a second plurality of seismometers arranged in line with each other, said two lines intersecting at approximately right angles, said generating means being located within the angle formed by said two lines in horizontally offset position to each of said two lines, the offset distance being not more than about 1000 feet, a plurality of recorder elements, and means for actuating each of said recorder elements separately by at least one of said seismometers, whereby a record of the progressive variations in reflected seismic waves received by the various seismometers is obtained.

11. Apparatus according to claim 10 in which said two lines of seismometers intersect at a common end seismometer, and in which progressive variations corresponding to reflected seismic waves received by all of said seismometers are recorded in the form of a plurality of traces on a single record.

12. Apparatus for reflection seismic surveying comprising means for generating seismic waves, a plurality of seismometers arranged in line with each other, a second plurality of seismometers arranged in line with each other, said generating means being located substantially at the intersection of the perpendicular bisectors of the two lines of seismometers and not more than about 1000 feet from either line of seismometers, a plurality of recorder elements, and means for actuating each of said recorder elements separately by at least one of said seismometers, whereby a record of the progressive variations in reflected seismic waves received by the various seismometers is obtained.

HENRY SALVATORI.

DISCLAIMER 2,117,364.—*Henry Salvatori*, Hollywood, Calif. APPARATUS FOR SEISMIC SURVEYING. Patent dated May 17, 1938. Disclaimer filed December 27, 1939, by the assignee, *Stanolind Oil and Gas Company*.

Hereby enters this disclaimer to claims 1 to 8 inclusive, and claims 10 and 12 of said patent; claim 10 being disclaimed without prejudice to claim 11.

[*Official Gazette January 30, 1940.*]